US012301473B2

(12) United States Patent
Tourrilhes et al.

(10) Patent No.: US 12,301,473 B2
(45) Date of Patent: May 13, 2025

(54) EXCESS ACTIVE QUEUE MANAGEMENT (AQM): A SIMPLE AQM TO HANDLE SLOW-START

(71) Applicant: Hewlett Packard Enterprise Development LP, Spring, TX (US)

(72) Inventors: Jean Tourrilhes, Mountain View, CA (US); Puneet Sharma, Palo Alto, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 18/447,753

(22) Filed: Aug. 10, 2023

(65) Prior Publication Data

US 2024/0388541 A1 Nov. 21, 2024

Related U.S. Application Data

(60) Provisional application No. 63/467,840, filed on May 19, 2023.

(51) Int. Cl.
*H04L 47/625* (2022.01)
*H04L 47/12* (2022.01)

(52) U.S. Cl.
CPC .......... *H04L 47/6255* (2013.01); *H04L 47/12* (2013.01); *H04L 47/627* (2013.01)

(58) Field of Classification Search
CPC ..... H04L 47/50; H04L 47/2441; H04L 47/24; H04L 47/30; H04L 47/32; H04L 47/6255; H04L 47/11; H04L 47/10; H04L 47/12; H04W 8/04
See application file for complete search history.

(56) References Cited

U.S. PATENT DOCUMENTS

| | | | | |
|---|---|---|---|---|
| 5,920,700 A * | 7/1999 | Gordon | ............... | G06F 3/067 725/92 |
| 6,182,252 B1 * | 1/2001 | Wong | ............... | H04L 47/266 714/708 |
| 6,188,698 B1 * | 2/2001 | Galand | ............... | H04L 49/3081 370/389 |
| 6,324,165 B1 * | 11/2001 | Fan | ............... | H04L 49/203 370/413 |
| 6,657,960 B1 * | 12/2003 | Jeffries | ............... | H04L 47/30 370/413 |
| 7,085,236 B2 | 8/2006 | Oldak et al. | | |
| 7,136,972 B2 | 11/2006 | Kao et al. | | |

(Continued)

*Primary Examiner* — Ranodhi Serrao
(74) *Attorney, Agent, or Firm* — Yao Legal Services, Inc.

(57) ABSTRACT

A system maintains a queue for storing packets, which are enqueued at a tail of the queue and dequeued at a head of the queue. The system computes a queue utilization value, based on the packets stored in the queue. The system computes an excess amount value, based on the packets stored in the queue and previously tagged as excess packets. The system receives a first packet at the tail of the queue and determines whether a difference between the queue utilization value and the excess amount value exceeds a predetermined threshold. Responsive to determining that the difference exceeds the predetermined threshold, the system tags the first packet as an excess packet. Responsive to tagging the first packet as an excess packet, the system performs an operation associated with the first packet or a second packet at the head of the queue to reduce congestion.

20 Claims, 6 Drawing Sheets

(56) References Cited

U.S. PATENT DOCUMENTS

| | | | |
|---|---|---|---|
| 7,221,656 | B1 | 5/2007 | Aweya et al. |
| 7,301,907 | B2 | 11/2007 | Anbarani |
| 7,324,554 | B1* | 1/2008 | Ginjpalli ............... H04L 47/525 |
| | | | 370/468 |
| 7,336,611 | B1 | 2/2008 | Aweya et al. |
| 7,424,546 | B1 | 9/2008 | Aweya et al. |
| 7,590,054 | B1* | 9/2009 | Holness ............... H04L 12/4633 |
| | | | 370/244 |
| 7,602,720 | B2 | 10/2009 | Bergamasco et al. |
| 7,706,261 | B2 | 4/2010 | Sun et al. |
| 8,171,562 | B2* | 5/2012 | Feng ................... H04L 63/1458 |
| | | | 713/168 |
| 8,321,955 | B2* | 11/2012 | Feng ................... H04L 63/1458 |
| | | | 713/168 |
| 8,422,367 | B2 | 4/2013 | Chen et al. |
| 8,693,320 | B2* | 4/2014 | Furbeck ............ H04W 28/0284 |
| | | | 370/229 |
| 9,092,282 | B1* | 7/2015 | Leonard ............... G06F 11/3442 |
| 9,351,194 | B2* | 5/2016 | Furbeck ................ H04W 28/02 |
| 10,116,712 | B2* | 10/2018 | Ma ......................... H04L 65/765 |
| 10,445,322 | B1* | 10/2019 | Kommera ............. G06F 16/284 |
| 10,673,648 | B1* | 6/2020 | Viljoen ............... G06F 13/4282 |
| 11,140,581 | B2* | 10/2021 | Oyman ................. H04W 28/22 |
| 11,184,297 | B2* | 11/2021 | Kaku ................. H04L 49/3027 |
| 11,741,096 | B1* | 8/2023 | Kanuparthy ........ G06F 16/9024 |
| | | | 707/716 |
| 2003/0007452 | A1* | 1/2003 | Gorti ....................... H04L 47/10 |
| | | | 370/428 |
| 2005/0050364 | A1* | 3/2005 | Feng ................... H04L 63/1458 |
| | | | 726/4 |
| 2006/0023061 | A1 | 2/2006 | Vaszary et al. |
| 2009/0122698 | A1* | 5/2009 | Lakshmikantha ...... H04L 47/11 |
| | | | 370/412 |
| 2010/0031315 | A1* | 2/2010 | Feng ................... H04L 63/1458 |
| | | | 709/229 |
| 2011/0075563 | A1* | 3/2011 | Leung ............... H04W 28/0289 |
| | | | 370/236 |
| 2011/0170408 | A1* | 7/2011 | Furbeck ................ H04L 47/33 |
| | | | 370/230 |
| 2012/0051216 | A1* | 3/2012 | Zhang ................... H04W 28/12 |
| | | | 370/230 |
| 2012/0213078 | A1* | 8/2012 | Kitada ................... H04L 47/17 |
| | | | 370/236 |
| 2012/0278511 | A1* | 11/2012 | Alatorre ................ G06F 3/0605 |
| | | | 710/33 |
| 2012/0278512 | A1* | 11/2012 | Alatorre ................ G06F 3/0659 |
| | | | 710/33 |
| 2013/0010598 | A1* | 1/2013 | Ludwig ............ H04W 28/0231 |
| | | | 370/235 |
| 2013/0194937 | A1* | 8/2013 | Sridhar ................... H04L 47/24 |
| | | | 370/252 |
| 2013/0242741 | A1* | 9/2013 | Ozawa ................... H04L 47/25 |
| | | | 370/235 |
| 2014/0003242 | A1* | 1/2014 | Nadas ..................... H04W 8/04 |
| | | | 370/235 |
| 2014/0118462 | A1* | 5/2014 | Zhao ................... H04W 72/543 |
| | | | 348/14.02 |
| 2014/0126502 | A1* | 5/2014 | Westberg ........... H04W 72/542 |
| | | | 370/329 |
| 2014/0297844 | A1* | 10/2014 | Kancherla ........... H04L 43/0894 |
| | | | 709/224 |
| 2014/0341015 | A1* | 11/2014 | Johansson ............... H04L 69/22 |
| | | | 370/474 |
| 2016/0219088 | A1* | 7/2016 | Ma ......................... H04L 65/765 |
| 2016/0323782 | A1* | 11/2016 | Baillargeon ...... H04W 28/0284 |
| 2017/0053217 | A1* | 2/2017 | Pardesi ................. G06Q 10/02 |
| 2017/0153835 | A1* | 6/2017 | Miki ..................... G06F 3/0625 |
| 2018/0309688 | A1* | 10/2018 | Sarker ..................... H04L 65/60 |
| 2019/0007464 | A1* | 1/2019 | Hori ....................... H04L 65/70 |
| 2019/0215729 | A1* | 7/2019 | Oyman ............... H04L 65/1016 |
| 2019/0273770 | A1* | 9/2019 | Huang ............... H04L 65/1069 |
| 2019/0357036 | A1* | 11/2019 | Leung ................... H04W 28/22 |
| 2020/0304432 | A1* | 9/2020 | Kaku ................. H04L 49/3027 |
| 2022/0283871 | A1* | 9/2022 | Zhao ..................... H04M 15/77 |

* cited by examiner

EXCESS ACTIVE QUEUE MANAGEMENT (AQM): A SIMPLE AQM TO HANDLE SLOW-START

RELATED APPLICATION

This application claims the benefit of U.S. Provisional Application No. 63/467,840, entitled "EXCESS-AQM, A SIMPLE AQM TO HANDLE SLOW-START," by inventors Jean Tourrilhes and Puneet Sharma, filed 19 May 2023.

BACKGROUND

Field

Multiple streams of data may be merged onto the same network link, which can result in congestion. Transport Control Protocol (TCP) attempts to minimize congestion while preserving fairness and maximizing application performance. Different versions exist of TCP and methods of signaling congestion to TCP endpoints. For example, Active Queue Management (AQM) can enable network elements to optimally signal congestion to TCP endpoints, which can result in an improvement in performance of traffic flow through the network elements. However, modern AQM techniques may be complex and may not sufficiently address reduced performance at the start of a TCP connection (referred to as "Slow-Start").

BRIEF DESCRIPTION OF THE FIGURES

In the figures, like reference numerals refer to the same figure elements.

DETAILED DESCRIPTION

Figure 1:
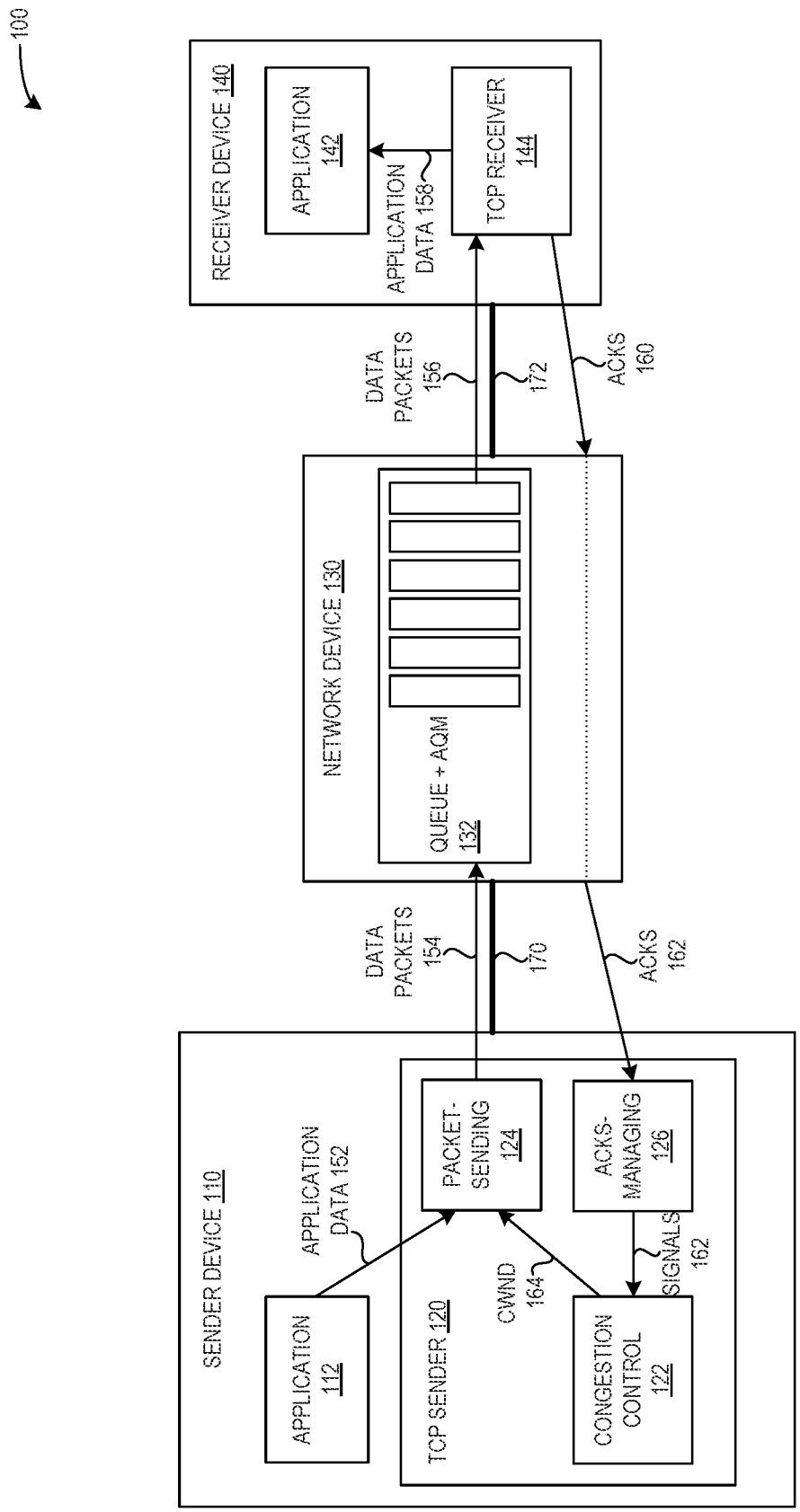
FIG. 1 illustrates an environment which includes TCP congestion control, in accordance with an aspect of the present application.

Aspects of the instant application provide a set of "excess-AQM" techniques which provide improvements to TCP-based communications, including in the Slow-Start mode. The excess-AQM techniques described in the instant application can emulate Tail-Drop, but can use explicit congestion notification (ECN) or Data Center TCP (DCTCP)/Low Latency, Low Loss, and Scalable Throughput (L4S) signaling. The excess-AQMs can be simpler than most modern AQMs and do not require any configuration parameters beyond the usual queue threshold. Thus, implementation of the excess-AQMs may consume fewer resources and can be used more efficiently in multi-queue designs.

The set of new AQM techniques can include: "excess-AQM-tail," in which packets are tagged as excess and marked to signal congestion prior to enqueuing at the tail of the queue, as described below in relation to FIGS. 2 and 3; "excess-AQM-head," in which packets are tagged as excess prior to enqueuing and marked subsequent to dequeuing at the head of the queue based on a global flag set when a packet is tagged as an excess packet at the tail of the queue, as described below in relation to FIGS. 2 and 4; and "excess-AQM-both," in which packets are tagged as excess prior to enqueuing and marked subsequent to dequeuing at the head of the queue based on both the global flag and whether the dequeued packet is tagged as an excess packet, as described below in relation to FIGS. 2 and 5.

The terms "tail drop" and "Tail-Drop" are used interchangeably in this disclosure and refer to discarding a received packet which arrives at the tail of a queue which is full.

The terms "packet drop" and "packet-dropping" are used interchangeably in this disclosure and refer to discarding a packet, e.g., upon receipt at a queue which is determined to be full as in Tail-Drop. Packet-dropping may occur as part of packet loss in a network.

The terms "packet marking" and "marking a packet" are used interchangeably in this disclosure and refer to marking a packet to indicate congestion, e.g., setting an explicit congestion notification congestion experienced (ECN-CE) value in a header of a packet, modifying metadata associated with the packet, etc.

The terms "excess-AQMs" and "excess-AQM techniques" are used interchangeably in this disclosure and refer to one of the AQMs described herein, including excess-AQM-tail, excess-AQM-head, and excess-AQM-both.

The term "queue utilization value" can be based on packets stored in the queue, e.g., a number of the stored packets, a size or a number of bytes of the stored packets, or a queuing delay associated with the stored packets.

The term "excess amount value" can be based on packets stored in the queue and which have been previously tagged as excess packets, e.g., a number of excess packets stored in the queue, a size or a number of bytes of the excess packets stored in the queue, or a queuing delay associated with the excess packets stored in the queue.

The term "excess test" refers to a decision or determination made by an excess-AQM regarding whether an incoming or received packet at the tail of a queue is in excess, e.g., based on the queue utilization value and the excess amount value. A packet may be tagged as an excess packet based on the result of the excess test. A detailed description of the excess test is provided below in the section titled "Excess-AQMs."

Queues; TCP Congestion Control; AQMs; TCP Slow-Start

Network elements (e.g., routers, switches, etc.) may have multiple network links connected to them. A network element can enable the connection of multiple network links to each other and can also forward incoming traffic to the proper outgoing link. Each link may have a finite outgoing capacity and can transmit only one packet at a time. The traffic to be forwarded on a link may arrive from many links and may be unpredictable or bursty. One current solution to handle the mismatch between these incoming and outgoing properties is to implement a queue on the outgoing interface of each link. The queue can store incoming bursts of traffic, and the outgoing interface can send traffic on the link from the queue at the appropriate pace (usually as fast as the link is capable). Thus, a queue can accommodate a temporary excess in input rate by storing packets and smoothing out the processing at the outgoing link.

Because memory is limited, a queue has finite capacity and can only store short-term excess traffic, which is usually associated with network burstiness. Long-term excess traffic is usually due to congestion, when various senders collectively send more traffic than can be handled by the queue. In the event of congestion, a system may desire to slow down the traffic sent by the senders to prevent long-term excess traffic. The system may require traffic to implement a form of congestion control in order to detect congestion and slow down congestion appropriately.

Most network communications can be layered over the TCP protocol. The performance of a TCP connection on a network path can generally be governed by the TCP congestion control. The TCP congestion control attempts to determine the optimal sending rate to send traffic, e.g., by inferring when the network path is congested and when it is not. The TCP congestion control can constantly monitor the TCP congestion, increase the sending rate if the network path is not congested, and decrease the sending rate if the network path is congested. The TCP congestion control can detect congestion on a network path using three methods. In a first method, the TCP congestion control can measure packet losses. Many bottlenecks in traffic may react to congestion by dropping packets. The rate at which packets are dropped usually indicates the level of congestion. In a second method, the TCP congestion control can measure the variation of packet delay. In general, congestion at the bottleneck may cause packets to be queued, waiting to be processed by the bottleneck. This queuing can increase the packet transmission time over the network path, where the amount of additional delay usually indicates the level of congestion. In a third method, a bottleneck can explicitly signal the congestion, e.g., by setting a flag in a packet, such as the explicit congestion notification congestion experienced (ECN-CE) value in a header. The rate at which congestion signals are included in received packets usually indicates the level of congestion. Currently, TCP congestion controls primarily use packet losses to measure congestion (and optionally ECN if supported by the network).

FIG. 1 illustrates an environment 100 which includes TCP congestion control, in accordance with an aspect of the present application. Environment 100 can include a sender device 110, a network device 130, and a receiver device 140. Sender device 110 can send data to receiver device 140 through network device 130 (via links, communications, or connections 170 and 172). Sender device 110 can include: an application 112; and a TCP sender 120, which can include a congestion control unit 122, a packet-sending unit 124, and an acknowledgments-managing unit 126. Network device 130 can include a queue with active queue management (AQM) 132. Receiver device 140 can include: an application 142; and a TCP receiver 144.

Application 112 associated with sender device 110 can send application data 152 to TCP sender 120, and packet-sending unit 124 can send data packets 154 to network device 130. AQM 132 can determine whether to drop, mark, and/or enqueue data packets 154 as they arrive at the tail of the queue, using an AQM technique as described herein. When the packets arrive at the head of the queue, a scheduler or other component can determine whether to forward the dequeued packets. If the packets are forwarded onwards, TCP receiver 144 of receiver device 140 can receive data packets 156 and pass the packets on as application data 158 to application 142 of receiver device 140.

Upon receiving data packets 156, TCP receiver 144 can also send back to TCP sender 120 acknowledgments ("acks") 160 of the received data packets (e.g., of data packets 156). Acknowledgments-managing unit 126 of TCP sender 120 can receive acknowledgments 160 (as acknowledgments 162) and indicate any ECN signals noted in the acknowledgments by sending signals 162 to congestion control unit 122. Upon receiving ECN signals related to packets indicated by acks 162 (as processed by unit 126), congestion control unit 122 can determine a congestion window ("CWND") and send an indication of a CWND 164 to packet-sending unit 124, which indication can cause packet-sending unit 124 to stop or reduce its rate of sending data over link 170.

Tail-Drop Losses; Packet Losses as Congestion Signal; BufferBloat

A basic implementation of an outgoing network interface can be a simple queue of fixed capacity before the outgoing link, as a First In, First Out (FIFO) queue where packets are processed in the order in which they arrive at the queue (e.g., queue 132 of FIG. 1). Incoming packets can be added at the tail of the queue (input or enqueued), and a scheduler can remove packets from the head of the queue (output or dequeued) for forwarding.

Simple queues may have a maximum size (e.g., a maximum number of packets or bytes). If packets arrive at the queue faster than the link can send them out, the packets may accumulate in the queue, causing the queue to become greater in size or length. When the queue is full, all received packets are discarded or dropped. In a simple FIFO queue, the packet losses occur at the tail of the queue (referred to as "Tail-Drop" losses). Other policies, including the use of AQMs, are described below.

Network devices with a more complex queuing structure (e.g., multiple sub-queues) may prioritize certain classes of traffic to implement Quality of Service (QoS) or to improve fairness amongst flows. Because the overall queuing structure as well as the individual sub-queues have finite capacity, too much congestion may also eventually cause packets to be dropped in the multiple sub-queues.

In general, most networks are lossy (i.e., packets may get lost or dropped), and packet losses are usually primarily caused by congestion. Furthermore, if the input rate of traffic is consistently higher than what a link can transmit, the only solution to this imbalance may be to discard the excess traffic, which results in packet drops (e.g., Tail-Drop, which discards incoming packets when the queue is full).

Most packet-dropping policies, including Tail-Drop, are indiscriminate and can affect all users of a queue. Packet-dropping can result in inefficiencies, including: dropped packets require retransmission, which can be wasteful of time and network resources; dropped packets can impact real-time connections that depend on prompt delivery of data, and the missing data in the lost packets may force the receiver to degrade the user experience; and dropped packets can create head-of-line blocking for TCP connections, such that the TCP receiver (which delivers packets to applications in order) must buffer all data received after the lost data, where the buffered data can be passed to the application only upon receipt of the retransmitted data.

However, packet drops can be the most unambiguous signal of congestion, indicating that too many packets are sent on the network path. As a result, most variations of TCP congestion control use packet loss exclusively to regulate the data-sending rate and to avoid network congestion. TCP congestion control can repetitively increase its rate, which can result in packet drops, and TCP congestion control can measure the packet drops to infer the rate at which the network path is congested. Thus, the packet losses can effectively serve as a congestion signal needed by TCP to perform congestion control.

Latency can be a critical factor which impacts network performance. Round Trip Time (RTT) is a metric commonly used to evaluate the performance of a network path. A higher RTT can detrimentally impact any real-time network application and may also decrease TCP throughput. The RTT can be based on a sum of: the transmission time on each link of the network path; the processing time on each device of the network path; and the queuing time in each queue of the network path. The transmission time and processing time can be assumed to be mostly constant and independent of network conditions. The "baseline RTT" can be defined as the sum of all transmission times and processing times. Assuming no rerouting is occurring on the network path, the baseline RTT can be assumed to be constant. The queuing times can depend on the configuration of each queue as well as the amount of traffic in each queue. The queuing time at a loaded bottleneck may not be negligible and can be of the same order of magnitude as the baseline RTT or even greater. This additional latency, referred to as "BufferBloat," can be unwelcome.

BufferBloat is caused mostly due to the fact that TCP depends on tail dropping. Most queues are configured with a large amount of buffer to minimize packet losses that impact applications. However, TCP congestion control will always attempt to increase its sending rate until it detects packet losses. When a queue is a bottleneck for TCP, only Tail-Drop may cause TCP to slow down. As a result, the queue is operating close to the point of Tail-Drop, which means that the queue is nearly full. When a queue is nearly full, any packet arriving to the queue must wait for all the packets ahead of it to be processed, which can create this additional queuing latency.

Active Queue Management (AQM); Explicit Congestion Notification (ECN)

Tail-Drop and large queues may lead to BufferBloat and performance issues with TCP congestion control. With Tail-Drop, TCP can cause the queue to always be nearly full, which can result in a large queuing delay as the processing and forwarding of all enqueued packets must wait for the entirety of the queue to be processed. Furthermore, Tail-Drop may be overly strong, as packets may be dropped until the TCP sender reacts, which can result in many packets being dropped. Tail-Drop may also be indiscriminate, as packet drops can affect all TCP connections using the queue during the congestion phase, without attempts at fairness.

Active Queue Management (AQM) techniques can remedy the challenges of Tail-Drop, including the high rate of packet drop and the lack of fairness. AQM techniques can add additional processing at the queue to drop a few selected packets before the queue is full. TCP congestion control can react to these losses by reducing its sending rate. As a result, the TCP sender can decrease (i.e., slow down) its sending rate before the queue is full, and the average size of the queue can remain smaller. This can result in decreasing the overall delay of packets and the congestion signal, which can increase TCP performance.

Most AQMs can drop significantly fewer packets than Tail-Drop. Most AQMs can mark packets randomly, such that TCP connections can receive congestion signals in proportion to the amount of traffic at the bottleneck, which can result in improved fairness. One current AQM technique is Random Early Detection (RED), which defines a probability of drop based on the queue occupancy. When the queue is almost empty, the probability is close to 0, and packet drop is very unlikely. When the queue is almost full, the probability is higher, and packet drop is more likely. Other AQMs (e.g., Blue, Adaptive Random Early Detection (ARED), Proportional Integral Enhanced (PIE), PI2, and Controlled Delay (CoDel)) may use more complex mechanisms, but the aim remains the same, i.e., to maintain a low occupancy of the queue by dropping packets preventively and proactively. Most modern AQMs can base their drop probability on queuing delay (e.g., CoDel attempts to maintain the queue delay for all packets below a configured threshold).

As described herein, packet drops are generally undesirable. The use of AQM can reduce, but not completely eliminate, the amount of packet losses, as packet losses are required to slow down TCP congestion control. Explicit Congestion Notification (ECN) can add a mechanism in the TCP protocol to carry a congestion signal without the need to drop packets. An "ECN field" (or "ECN flag") in the TCP header part of the packet can indicate congestion. The sender can set the ECN field to zero. Network devices which experience congestion may change the value of this field to ECN "congestion experienced" (ECN-CE) to indicate congestion, and the receiver can reflect this field to the sender. If the sender determines that this field is set, the sender can assume congestion and reduce its sending rate, as if that packet was dropped.

When ECN is combined with a form of AQM, the AQM can measure congestion and determine which packets to mark with ECN. If ECN is supported, when the AQM measures some congestion, some of the packets can be marked with a congestion signal. The AQM can simply change the ECN field in the TCP header to ECN-CE to signal that congestion, and the packet is not dropped.

ECN may not be supported by all implementations of TCP/IP. As a result, when an AQM experiences congestion, the AQM can mark packets that need to carry the congestion signal. If the packet indicates ECN support, marking the packet can result in modifying the packet to change the ECN field; otherwise, marking the packet can result in the packet being dropped.

One advantage of ECN is that a packet marked with the ECN flag can have exactly the same semantic meaning as a packet drop. Thus, the same AQM can support both packet drop and ECN, because the marking rate can be the same. Furthermore, integration with existing TCP congestion control may be easier, as both a packet drop and the ECN flag can be treated the same by the congestion control and cause the same reaction.

DataCenter-TCP; and Low Latency, Low Loss, Scalable Throughput

As described herein, packet losses may result in inefficiencies. Thus, TCP congestion control is generally designed to minimize the number of congestion drops. As a result, TCP can react drastically to any packet loss, e.g., reducing its sending rate by half (e.g., TCP-Reno) or 30% (e.g., TCP-Cubic). This may allow ample time for the queue at the bottleneck to drain and recover, and the sequence of packet drops may be spaced out.

The ECN standard defines an ECN marking as having the same semantic and effect as a packet drop. Thus, when using ECN, congestion signals may also have a drastic effect, resulting in the TCP sender reducing its rate by the same 50% or 30%. This strong reaction to the ECN signal may result in several issues. After such a strong reduction, a certain amount of time must elapse while the sender increases its sending rate back to the congestion level. Thus, congestion phases may be spaced out, with significant time between ECN sequences. As a result, more time must pass for the queue to notify the sender of the new congestion level. This can result in making the overall feedback loop of the control system slow and potentially unstable. The strong reaction to the ECN signal may also create a large amount of entropy in the queue itself, due to the sender varying its rate by a large amount. Thus, the queue may be constantly filled and drained in a cycle by the TCP congestion control. This burstiness of TCP may force the queue to maintain a significant amount of headroom to handle those bursts, which can result in a higher average latency with a significant amount of jitter, which can impact all users of the queue.

DataCenter-TCP (DCTCP) is a congestion control that can repurpose the ECN bit to achieve smoother regulation of TCP traffic. In DCTCP, both the TCP sender and the AQM may need to be changed. DCTCP can define a much smaller reaction to receiving ECN markings or signals, e.g., the congestion window can be effectively reduced by half a packet for each marking, which is much less than the 50% or 30% reduction of "Classical" TCP. Because the sending rate reduction is much smaller, the sender may take a shorter time to increase the sending rate back to congestion level (typically one RTT). This can force the AQM to send the congestion signal much more frequently, which in turn can increase the speed of the feedback loop and result in a much more controlled and smooth TCP rate. TCP burstiness can be almost eliminated and queues may be enabled to operate at much lower occupancy, which can decrease latency and increase overall performance. The type of congestion signal used by DCTCP can be considered "fine-grained" congestion signals, while the type of congestion signals associated with packet drops or the original ECN can be considered "coarse" congestion signals. DCTCP can also redefine the semantic of the ECN bit. Thus, DCTCP cannot coexist with the Classical version of TCP (which expects the standard semantic of ECN). Furthermore, DCTCP cannot be deployed over the Internet.

The Low Latency, Low Loss, Scalable Throughput (L4S) framework can address the coexistence issues by enabling both semantics. A flag in the packet can indicate which semantic is desired by that TCP connection, and the AQM in the queue can generate ECN signals based on which semantic is requested by the TCP packet. This can allow both "Classical" TCP and "Scalable" DCTCP to be used in the same deployment, thus deploying a DCTCP-style congestion control over the Internet. A "Scalable TCP" refers to a TCP Congestion Control that uses the L4S semantic, because its reaction is proportional to the number of congestion signals (e.g., DCTCP). A "Classical TCP" refers to a TCP Congestion Control that uses the original semantic of ECN.

The Some Congestion Experienced (SCE) protocol can be an alternate to L4S and can address the same coexistence issues for DCTCP and Classical TCP. While the SCE protocol can leave the semantic of ECN unchanged, it introduces a new "SCE flag" in the packet to carry the fine-grained congestion signal needed by DCTCP. Thus, with SCE, Classical TCP can remain unmodified, while DCTCP may be modified to use the SCE flag instead of the ECN flag.

Other AQMS; AQMs for Other Network Technologies

Some current AQMs may be based in control theory, e.g., a Proportional Integral Controller (PI), a Proportional Integral Enhanced (PIE) controller, and a PI2. However, while these control theory-based AQMs may provide some advantages, the main disadvantage is their complexity, e.g., implementation, computation, tracking of internal state, and careful tuning of additional parameters.

While PI2 is the main AQM in practice used with the L4S standard, another AQM is the Step-AQM, which repurposes the readily available RED AQM into an AQM for DCTCP. Step-AQM can simply mark all packets with ECN if the queue is larger than a configured threshold and never mark a packet if the queue is below the configured threshold. Step-AQM may appear similar to Tail-Drop, except that packets in excess are marked with ECN instead of dropped. The configured threshold in Step-AQM may be based on the size of the queue (e.g., a number of packets or a number of bytes) or the queue delay (e.g., by comparing the current queue delay to a delay threshold).

The complexity of many other AQMs (as described herein) can result in complex issues in the scenario of multiple queues. While parallel queues may benefit from AQM to decrease queue size and increase TCP performance, the AQM process would need to be performed independently for each queue, resulting in significant processing for varying queue conditions as well as significant overhead. Thus, a simple AQM would more efficiently handle the multi-queue scenario than the more complex previously described AQMs.

As described herein, multiple strategies may be used to manage congestion (e.g., Tail-Drop and AQM). TCP is one of the most popular transport protocols and can support two congestion signals: dropping packets; and setting the explicit congestion notification congestion experienced (ECN-CE) value in the header.

Another strategy to manage to manage congestion is flow control, a strict version of congestion management using explicit signals or dedicated packets which is generally designed to avoid any packet losses. Other network technologies can implement flow control, e.g., in networks that have a poor tolerance to packet losses.

IEEE Ethernet (802.3) can define various flow control features, which can be used for congestion management of the queues. In Ethernet, the "pause" frame can stop an adjacent Ethernet device from sending data for a short amount of time. Through judicious sending of pause frames, the level of congestion and queue length can be managed. Priority Flow Control (PFC) allows the pause frames to be made specific to a priority, which can enable performing congestion control separately for each class of service. Another Ethernet congestion management feature is Quantized Congestion Notification (QCN), which defines an AQM derived from the Proportional-Integral (PI) model, where the feedback is a 6-bit numerical value computed from the sub-queue size and sub-queue size increase. Yet another Ethernet congestion management feature is Source Flow Control (SFC), which defines an improved congestion control framework for Ethernet, where pause frames can be sent per flow and directly to the Ethernet node which is the source of the traffic.

TCP Congestion Avoidance and Slow-Start Modes

The TCP protocol can include two main modes of operation: Congestion Avoidance (CA); and Slow-Start. Slow-Start is the mode used when the connection is initiated. The TCP connection has no information on the network path it is using, so TCP can ramp up its speed exponentially until congestion is detected. The goal of Slow-Start is to quickly determine the approximate amount of bandwidth that may be accommodated by the network path.

After Slow-Start completes, TCP can enter Congestion Avoidance mode, which is the default mode. The goal of Congestion Avoidance is to maximize the throughput of the TCP connection without causing long term congestion while providing fairness to other users of the network. During Congestion Avoidance, TCP can increase its sending rate slowly until congestion is detected. Upon detecting congestion, TCP can either reduce its sending rate drastically (e.g., based on dropping packets or ECN-marking) or moderately (e.g., based on DCTCP, L4S, or SCE). Ideally, TCP always operates at the limit of congestion and adapt to changes on the network path. This can also provide fairness amongst TCP connections sharing the bottleneck.

Most TCP congestion controls use the default Slow-Start and only differ in Congestion Avoidance. Some TCP congestion controls can result in a large reduction of the sending rate when receiving a congestion signal (e.g., TCP-Reno reduces its rate by 50% and TCP-Cubic reduces its rate by 30%). The Slow-Start phase is generally very short, but can have a lasting influence on the performance of the TCP connection. In Congestion Avoidance mode, the sending rate can be increased only very slowly, and the initial sending rate used by Congestion Avoidance is based on the sending rate at the end of Slow Start. Thus, if Slow Start detects congestion incorrectly, the starting sending rate of Congestion Avoidance may be much too slow. This can result in the TCP connection taking a long time to increase its sending rate and achieve full performance.

Traffic during Congestion Avoidance and Slow-Start may behave differently, have very different speeds of rate increase, and may be operating on different time scales. It may be challenging to define and tune an AQM that reacts optimally to both Congestion Avoidance and Slow-Start.

"Excess-AQM": Three New Active Queue Management Techniques

Aspects of the instant application provide a set of AQMs ("excess-AQMs") which perform well for both TCP Congestion Avoidance and Slow-Start. The Excess-AQMs can emulate Tail-Drop but use ECN or DCTCP/L4S signaling, along with additional improvements. For example, the described excess-AQMs can be adapted to drop signaling for slight improvements over Tail-Drop. The excess-AQMs can be simpler than most modern AQMs and do not require any configuration parameters beyond the usual queue threshold. Thus, implementation of the excess-AQMs may consume fewer resources and can be used more efficiently in multi-queue designs.

The described excess-AQMs can provide several advantages over prior AQMs. The excess-AQMs can support ECN and L4S congestion signaling, deliver optimal TCP performance in most conditions, and properly handle the Slow-Start phase of TCP connections. The excess-AQMs can also provide for tight control of queue latency, scalability based on design for multi-queue systems, and simplicity in both implementation and analysis. The excess-AQMs include: "excess-AQM-tail," in which packets are tagged as excess and marked to signal congestion prior to enqueuing at the tail of the queue; "excess-AQM-head," in which packets are tagged as excess prior to enqueuing and marked subsequent to dequeuing at the head of the queue based on a global flag set when a packet is tagged as an excess packet at the tail of the queue; and "excess-AQM-both," in which packets are tagged as excess prior to enqueuing and marked subsequent to dequeuing at the head of the queue based on both the global flag and whether the dequeued packet is tagged as an excess packet.

Tracking Excess Packets

The Excess-AQMs depend upon accurately tracking excess packets in the queue. The Excess-AQMs can associate with the queue a piece of metadata, "exn", which tracks excess packets. The "exn" metadata can be a number of packets, a number of bytes, or a delay associated with the queue, based on the type of AQM desired. When a packet is received at the tail of the queue, an "excess test" may be performed (i.e., to determine whether a packet is in excess). If the packet is determined to be in excess, the system can increase "exn" by the appropriate amount (e.g., number of packets, number of bytes, or delay). When the packet reaches the head of the queue to be forwarded, if the packet was determined to be in excess, the system can decrease "exn" by the appropriate amount.

The result of the excess test (i.e., the decision about whether packets are in excess) performed at the tail of the queue must be preserved for processing at the head of the queue. One way to preserve the excess test result is to allocate one bit of metadata called "excess" associated with the packet in the queue, where the metadata stores the result of the excess test (i.e., the result of the decision). For example, when a packet is determined to be in excess, the "excess" tag can be set to true, otherwise the "excess" tag can be set to false (as the default). While there are no negative impacts to this method, not all queue designs allow associating metadata with packets.

Another way to preserve the excess test result is, when processing the packet at the head of the queue, to check whether the packet is marked with ECN. This method may be less exact, because the packet may have been marked with ECN by another queue upstream. In addition, this technique may only work for certain of the excess-AQMs (e.g., excess-AQM-tail).

The excess-AQMs described herein can be applied individually on each sub-queue of a complex queue structure. In such cases, the "exn" metadata can track the excess packets in a given sub-queue, and the excess test can apply only to the given sub-queue. In some aspects, the excess-AQMs can be applied to complex queue structures, such as queues including multiple sub-queues. In general, for such queues, the excess-AQMs can be applied across the entire queue structure, the "exn" metadata can track the sum of excess packets in all sub-queues, and the excess test can apply to the entire queue structure.

Excess-AQM-Tail: Using ECN with Tail-Drop

As discussed above, Tail-Drop is a simple policy to manage queues, but can result in significant inefficiencies when compared to other AQM techniques (as described above). ECN signaling can eliminate packet drops, reduce network resource wastage, reduce head-of-line blocking in TCP, and improve the performance of real-time connections while L4S signaling can reduce burstiness in the queue and enable queues to consume fewer resources.

Beyond its simplicity, Tail-Drop can be beneficial for use in an AQM because it is currently deployed over the Internet and various networks, and therefore all TCP congestion controls have been heavily optimized for Tail-Drop. In addition, Tail-Drop can offer good performance for both Congestion Avoidance and Slow-Start.

The excess-AQM techniques described herein use a modified Tail-Drop policy dedicated to ECN and L4S signaling. "Excess-AQM-tail" is the simplest of the excess-AQMs techniques. An essential problem for any AQM is determining when to send congestion signals. For Classical TCP, the Congestion Control can aggregate congestion signals into congestion events, rendering less relevant the actual number of congestion signals generated. One issue with Step-AQM is that a single congestion phase at the AQM can generate multiple congestion events at the TCP sender. Thus, the essential problem for the excess-AQMs can be reformulated as determining when to start sending congestion signals and when to stop sending congestion signals so that a congestion phase is aggregated as a single congestion event by the TCP sender. Specifically, it may be desirable to have the congestion events stop when the sending rate reduction reaches the queue.

The performance difference between Tail-Drop and Step-AQM can be seen from the fact that for Step-AQM, the excess packets are not dropped and instead are kept in the queue. In contrast, in the described aspects, the excess-AQMs track excess packets in the queue and remove the excess packets from consideration in the AQM.

The excess test can be performed as follows. Assume that "qlen" is the current length of the queue (i.e., "queue utilization value"), "exn" is indicative of excess packets in the queue (i.e., "excess amount value"), and "qthr" is the configured threshold for the queue (i.e., "predetermined threshold"). These variables can be defined as a number of packets, a number of bytes, or a delay, based on the type of AQM desired (e.g., the configured threshold or the predetermined threshold can be a number of packets, such as 42, or a number of bytes, such as 256 or 1024). In the "excess test," a packet can be determined to be in excess if the following is true:

$$qlen-exn>qthr$$

This can be a generalized form of the Tail-Drop condition and can apply to Tail-Drop and excess-AQM-tail. In Tail-Drop, excess packets are dropped and exn is always zero. In excess-AQM-tail, excess packets are marked with ECN and added to the queue.

Before congestion is detected, qlen will be smaller than qthr, and exn will be zero. In excess-AQM-tail, when qlen becomes greater than qthr, the packet that causes this may be considered to be in excess, marked with ECN, and placed in the queue (i.e., enqueued). In addition, exn can be increased. During congestion, the queue will grow (thus qlen will grow), but exn will grow by the same amount, so the quantity (qlen-exn) can remain close to qthr. This can be similar to how in Tail-Drop, the queue length can remain constant at the maximum. As soon as the TCP sender reduces its sending rate, qlen can start to decrease, and (qlen-exn) can become lower than qthr. Thus, after the sending rate reduction, packets may no longer be determined to be in excess and are not marked with ECN. Eventually, the excess packets can be forwarded by the queue, but usually by that point, fewer packets are entering the queue than exiting the queue, so qlen can decrease in concert with exn, while (qlen-exn) can remain lower than qthr and no packets are marked.

Thus, excess-AQM-tail can stop congestion signals at the point the TCP sending rate decreases at the queue. As a result, the congestion signals may remain within the RTT time window, and the TCP sender can aggregate them as a single congestion event. Excess-AQM-tail can perform better than Step-AQM for Slow-Start and Classical Congestion Avoidance and can perform similarly to Tail-Drop. By tracking excess packets in the queue, excess-AQM-tail can more faithfully emulate Tail-Drop and work better with the TCP sender. A method for facilitating the excess-AQM-tail technique is described below in relation to FIGS. 2 and 3.

Excess-AQM-Head: Reducing the Number of Marked Packets

The excess-AQM-head technique can improve upon the excess-AQM-tail technique by reducing the number of packets marked to indicate congestion, which can further improve the performance with TCP.

Using excess-AQM-tail, a single congestion phase may sometimes result in two congestion events at the TCP sender, which can result in two sending rate reductions and can reduce TCP performance. There are two reasons for the dual events and sending rate reductions. The first reason is that some TCP/Internet Protocol (IP) stacks implement a feature called Proportional Rate Reduction (PRR). When the TCP sender decides to decrease the sending rate, instead of doing it instantly, the TCP sender can gradually decrease the sending rate over a whole RTT period. Thus, after sending the CWR flag, the sending rate may still be higher than the bottleneck rate. This may result in congestion after the CWR flag arrives at the queue and may also cause the TCP sender to receive congestion signals after the CWR flag, thus creating a second congestion event.

The second reason is queue burstiness due to short term link speed variation and cross traffic variation. During the congestion phase, if the link speed is reduced or the cross traffic is increased, the duration of the congestion phase may be extended, which can create congestion after the CWR flag is received by the queue. Consequently, the TCP sender may receive congestion signals after the CWR flag, thus creating a second congestion event.

In order to reduce the effect of PRR and network burstiness, the congestion signals should stop well before the CWR flag, instead of just before. A simple way to do that is to perform packet marking at the head of the queue instead of the tail of the queue, as in excess-AQM-head.

In excess-AQM-tail, which performs packet marking at the tail of the queue (e.g., where packets are received at the queue), when a sending rate reduction reaches the queue, excess-AQM-tail can stop marking packets. However, there may still be many packets in the queue which are marked before and waiting to be forwarded.

In contrast, excess-AQM-head can perform packet marking at the head of the queue (e.g., where packets are forwarded). Because excess-AQM-tail stopped marking packets when a sending rate reduction reaches the queue, and because the queue does not contain any marked packets, no more marked packets are forwarded. On the other hand, packets with the CWR flag may be added to the queue and must wait for all the packets ahead in the queue before being forwarded. This can enable congestion signals to stop well before the packet with the CWR flag is eventually forwarded.

Thus, in order to mark packets at the head of the queue, excess-AQM-head must fully separate the process of tagging excess packets and the process of marking packets. Excess-AQM-head can also add a new piece of metadata to the queue, a global flag called "do_mark" which indicates whether the next forwarded packet is to be marked or not.

When a packet arrives at the tail of the queue, excess-AQM-head can check whether the packet is in excess (i.e., perform the excess test). If the packet is in excess, excess-AQM-head can tag it as an excess packet, enqueue the tagged packet, and set the global flag "do_mark" to true. As with excess-AQM-tail, the packet is determined to be in excess if the following is true:

$$qlen-exn>qthr$$

When a packet needs to be forwarded, excess-AQM-head can check the "do_mark" metadata (i.e., the global flag), and if it is true, mark that packet with ECN and clear or reset the global flag.

Note that a packet tagged as "excess" in the queue may not be marked with ECN, and conversely, a packet marked with ECN may not have been tagged as "excess." These two properties are disjoint with excess-AQM-head. Excess-AQM-head can eliminate the double congestion events and can improve TCP performance. Excess-AQM-head can also drastically reduce the number of marked packets. Multiple packets may be in excess between two forwarded packets, but excess-AQM-head may cause only a single packet to be marked. In general, the reduction in packet marking can be approximately the ratio between the input rate and the output rate of the queue.

Reducing the number of marked packets can provide two benefits. First, if packet drops are used instead of ECN, this can reduce the number of packet drops, which can be beneficial. Second, in the case of L4S and DCTCP, the actual number of packets with ECN does matter, as the sending rate decrease can be proportional to the number of packets with ECN received. Decreasing the number of packets with ECN can reduce the variation of the sending rate and the burstiness in the queue. A method for facilitating the excess-AQM-head technique is described below in relation to FIGS. 2 and 4.

Excess-AQM-Both: Adding Bursting to Slow-Start

The excess-AQM-both technique can improve upon the excess-AQM-head technique by allowing a burst of packets, which can improve both performance with TCP Slow-Start and fairness amongst TCP connections. Fairness is a well-known issue with marking at the head of the queue. A packet that is marked may not have been in excess, and therefore may have arrived prior to congestion and may not be related to the congestion condition. As a result, when multiple TCP connections are using the queue, excess-AQM-head may be more likely to mark packets for a TCP connection that is not causing the congestion. On the other hand, the excess packets may not be marked, and therefore excess-AQM-head is less likely to mark packets for a connection that is causing the congestion. This can create unfairness between TCP connections.

Further, the performance of excess-AQM-head with Slow-Start may be worse than excess-AQM-tail. Excess-AQM-head can cause TCP to react to congestion faster than excess-AQM-tail. With excess-AQM-head, as soon as there is congestion, some packets are forwarded with the ECN flag, while with excess-AQM-tail, the same congestion signal must travel through the queue, adding the latency of a full queue. As a result, excess-AQM-head can cause TCP to reduce its rate faster and can have better control over the queue length and latency, where the queue may only minimally exceed its threshold.

The tighter control of the queue of excess-AQM-head may be beneficial for latency-sensitive applications, but can harm the performance of TCP. First, the TCP Slow-Start is designed for Tail-Drop. With Tail-Drop, the packets are dropped at the tail of the queue, and the congestion signal must travel through the queue and incur extra latency. During that time, TCP can continue to increase its sending rate. TCP can compensate for the extra latency and reduce its sending rate, which can be optimal for Tail-Drop and Excess-AQM-tail. However, with excess-AQM-head, TCP can stop increasing its rate earlier, and as a result, the rate after Slow-Start may be lower than optimal. Second, if a new TCP flow starts on a queue which is already loaded with TCP traffic, due to the tight control of excess-AQM-head, its Slow-Start may be able to add only a very small number of packets before receiving a congestion signal. As a result, excess-AQM-head may start with a very small sending rate. With Tail-Drop and excess-AQM-tail, the added latency of congestion signals can allow this new TCP flow to raise its sending rate further and gain more bandwidth from the existing flows.

Thus, the AQM effectively needs to allow Slow-Start to burst above the threshold, to result in an optimal sending rate after Slow-Start.

Current methods to add a bursting mechanism to an AQM may add complexity and involve new parameters to tune. On the other hand, the behavior of excess-AQM-tail can be close to optimal. Excess-AQM-both can effectively combine excess-AQM-tail and excess-AQM-head, where excess-AQM-both can behave like excess-AQM-tail for the start of the congestion phase and like excess-AQM-head for the end of the congestion phase.

When a packet arrives at the tail of the queue, excess-AQM-both can behave exactly like excess-AQM-head. Excess-AQM-both can check if the packet is in excess. If the packet is in excess, excess-AQM-both can tag the packet as "excess" in the queue, enqueue the packet, and set the global flag "do_mark" to true. As with both excess-AQM-tail and excess-AQM-head, the packet can be determined to be in excess if the following is true:

$$qlen-exn>qthr$$

When a packet needs to be forwarded, excess-AQM-both can check both the "excess" tag on the packet and the global flag (e.g., the "do_mark" metadata). If both are true, Excess-AQM-both can mark that packet with ECN and clear the global "do_mark" flag.

At the start of the congestion, the global "do_mark" flag is set, but at that point, the packets in the queue are not in excess, so they are not marked. Only when the first tagged excess packet (thus setting the global flag) goes through the queue is any packet marked with ECN and forwarded, similar to Excess-AQM-tail. When the TCP sender reduces the rate, the global "do_mark" flag is no longer set, and no packet is forwarded with the ECN flag, even if they were in excess, which is similar to excess-AQM-head.

Thus, excess-AQM-both can behave exactly as expected. Excess-AQM-both can allow Slow-Start to burst over the threshold, like excess-AQM-tail, and can also avoid double congestion events at the TCP sender, like excess-AQM-head. Excess-AQM-both can offer better TCP performance than excess-AQM-tail and excess-AQM-head in most conditions and can mark a slightly smaller number of packets than excess-AQM-head. The marking of a smaller number of packets can result in decreased rate variations and queue burstiness for DCTCP.

In addition, only packets that are in excess are marked, so excess-AQM-both may be less likely to mark packets from a TCP connection not causing congestion, and therefore can be more fair than excess-AQM-head between TCP connections. A method for facilitating the excess-AQM-both technique is described below in relation to FIGS. 2 and 5.

Summary of Benefits of Excess-AQMs

As described here, the main benefit of using excess-AQMs over other AQMs is improved TCP performance. Compared to Tail-Drop, the excess-AQMs described herein can add support for ECN and L4S signalling, which can drastically reduce the number of dropped packets and reduce burstiness at the queue. This can improve the latency performance of traffic flowing through the queue. Compared to PI2, Excess-AQMs can offer improved TCP performance with Slow-Start, along with much less complexity. Specifically, the excess-AQMs do not have parameters which need to be carefully tuned. Excess-AQMs also have much less state, which can greatly improve scalability. The lesser complexity and improved scalability can result in a decreased cost, while the improved TCP performance can result in improved network application performance. Compared to Step-AQM, the excess-AQMs can offer improved TCP performance with both Slow-Start and Congestion Avoidance.

In addition to improved TCP performance, the excess-AQMs may be fairly easy to implement, easily added to various networking products, and especially useful for multi-queue designs.

Other Technological Areas and Applications

The excess-AQM techniques of the instant application have been described in the context of TCP traffic and ECN flags, but can also be adapted to other contexts. Excess-AQMs may work well with L4S and DCTCP traffic, as the excess-AQMs do not need to be modified for DCTCP traffic and can mark L4S and DCTCP packets the exact same way they would mark regular ECN packets. The excess-AQMs can usually outperform both PI2 and Step-AQM in the Slow-Start phase and can perform similarly to both PI2 and Step-AQM in the Congestion Avoidance phase, for throughput and queue variations.

While the excess-AQMs are described with setting the ECN-CE value when packets need to be marked, the excess-AQMs may also work well with dropping packets instead of setting the ECN-CE value. Excess-AQM-tail with dropping packets may be similar to Tail-Drop, and excess-AQM-head with dropping packets may be similar to Head-Drop (another classic queue policy). Excess-AQM-both with dropping packets may provide improvements over both excess-AQM-tail and excess-AQM-head. The performance of excess-AQM-both may be nearly identical to Tail-Drop, but the number of packets dropped can be drastically reduced.

In the described aspects of excess-AQMs, all packets that need to be marked are dropped or have ECN-CE set in the header. A probability of marking can also be added to the excess AQMs. Instead of marking all packets, a packet can be marked using a pseudo-random process in addition to the other conditions, which can make the Excess-AQMs more similar to RED. The probability of marking can be fixed or based on the queue state. Either RED or another AQM may be used to compute this probability, which may not add much additional complexity.

The excess-AQMs can also be combined with RED or another AQM by using the excess-AQMs to "gate" the other AQM, i.e., to prevent the other AQM to be used when the queue has no excess. The simplest form of such a combination can be to mark a packet only if both AQMs agree. However, this may generate too few markings in practice.

A more effective combination may be to combine AQMs in the same way that excess-AQM-both combines excess-AQM-tail and excess-AQM-head. The excess-AQM would only be used to generate the global "do_mark" flag on the queue. When a packet needs to be forwarded, that packet is marked only if the other AQM decides to mark it and the global "do_mark" flag is set. After marking the packet, the "do_mark" flag can be cleared.

Because the excess-AQMs generate binary feedback, they can be used in other network technologies which use binary feedback. The excess-AQMs can form the basis of most congestion management and flow control schemes. With Ethernet, an excess-AQM can be designed that generates pause frames to reduce the rate of the Ethernet device congesting the queue. More complex techniques can be designed to generate Ethernet pause frames based on an excess-AQM.

Excess-AQMs can also be applied outside of networking. For example, excess-AQMs may be used to manage a queue of requests at a server and prevent excessive queuing delay for requests. In this case, instead of containing packets, the queue can contain requests.

Methods and System for Facilitating Excess-AQM Techniques

Figure 2:
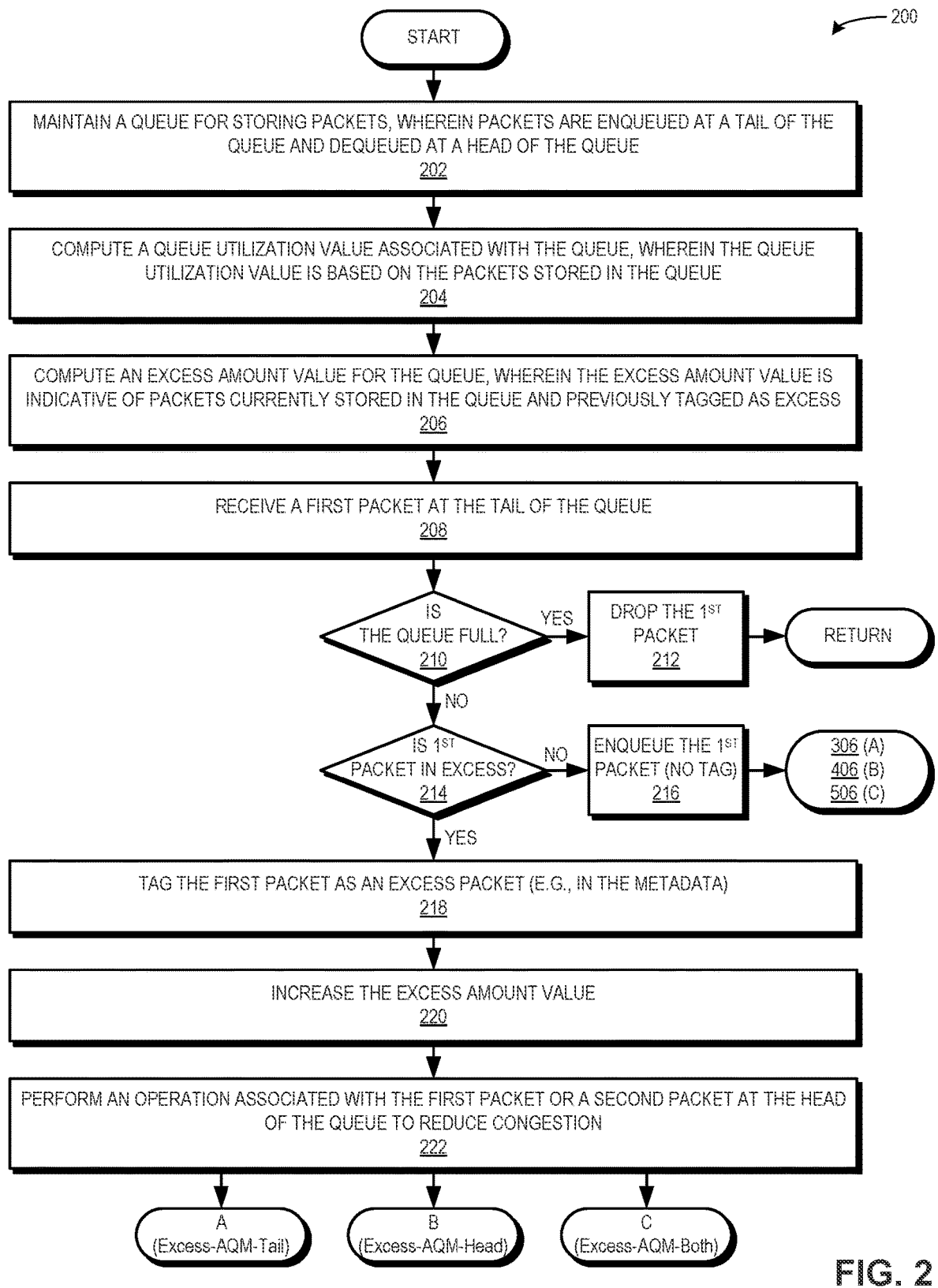
FIG. 2 presents a flowchart illustrating a method which facilitates an "excess-AQM" technique, in accordance with an aspect of the present application.

FIG. 2 presents a flowchart 200 illustrating a method which facilitates an "excess-AQM" technique, in accordance with an aspect of the present application. During operation, the system maintains a queue for storing packets, wherein packets are enqueued at a tail of the queue and dequeued at a head of the queue (operation 202). The system computes a queue utilization value associated with the queue, wherein the queue utilization value is based on the packets stored in the queue (operation 204). The system computes an excess amount value associated with the queue, wherein the excess amount value is indicative of packets currently stored in the queue and previously tagged as excess packets (operation 206). The system receives a first packet at the tail of the queue (operation 208). If the queue is full (decision 210), the system drops the first packet (operation 212) and the operation returns. If the queue is not full (decision 210), the system determines whether the first packet is in excess, i.e., whether a difference between the queue utilization value and the excess amount value exceeds a predetermined threshold (decision 214), where the predetermined threshold (or the configured threshold) can be defined based on a number of packets, a number of bytes, or a delay, as described above. If the packet is not in excess, i.e., the difference does not exceed the predetermined threshold (decision 214), the system enqueues the first packet (without any tagging or marking) into the queue (operation 216), and the operation continues at one of: operation 306 of FIG. 3 for excess-AQM-tail (Label A); operation 406 of FIG. 4 for excess-AQM-head (Label B); and operation 506 of FIG. 5 for excess-AQM-both (Label C).

If the packet is in excess, i.e., the difference between the queue utilization value and the excess amount value exceeds a predetermined threshold (decision 214), the system tags the first packet as an excess packet (e.g., in the metadata) (operation 218) and increases the excess amount value (operation 220). Responsive to tagging the first packet as an excess packet, the system performs an operation associated with the first packet or a second packet at the head of the queue to reduce congestion (operation 222). The operation continues at one of: Label A of FIG. 3 (for excess-AQM-tail); Label B of FIG. 4 (for excess-AQM-head); and Label C of FIG. 5 (for excess-AQM-both).

Figure 3:
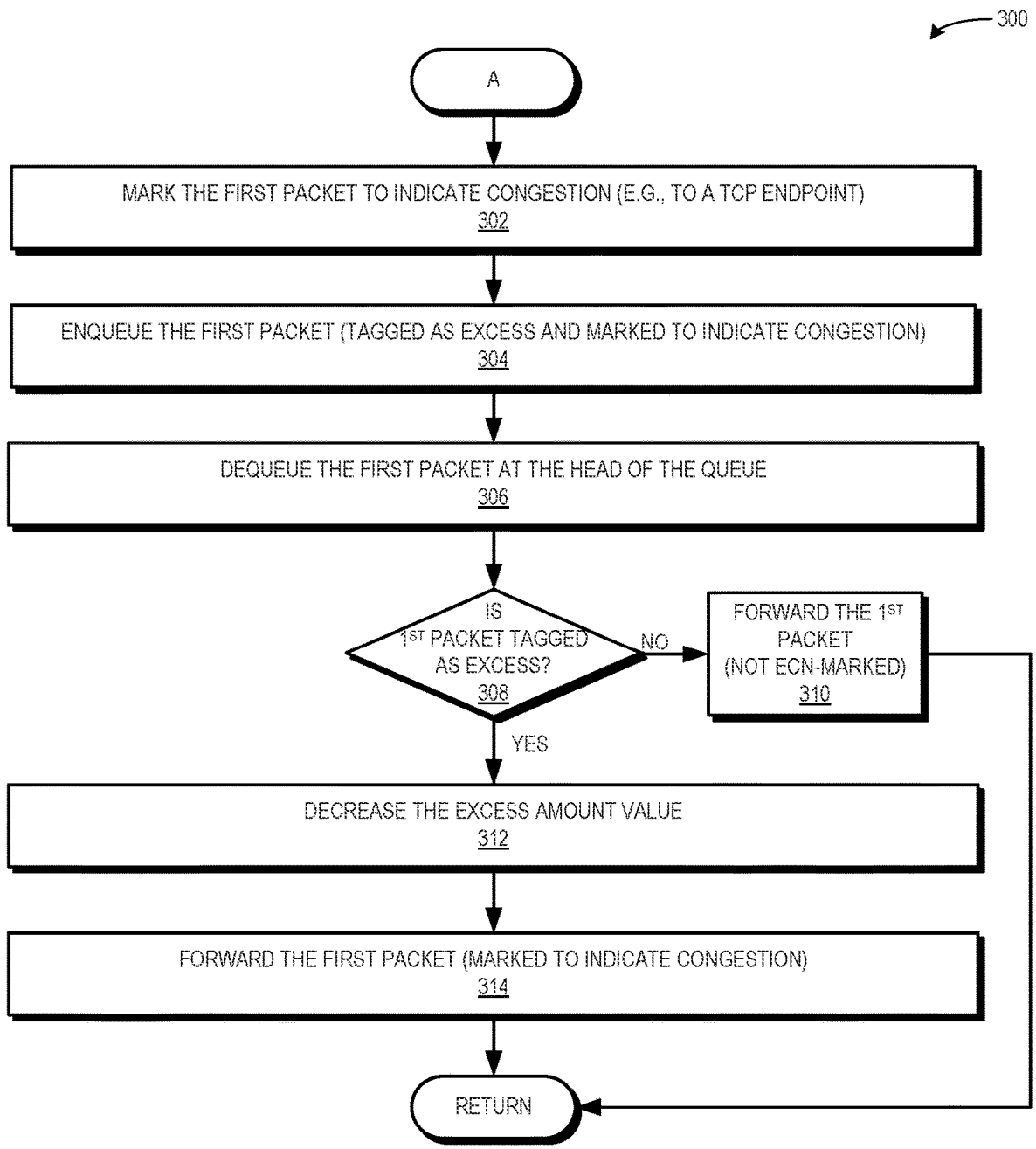
FIG. 3 presents a flowchart illustrating a method which facilitates an "excess-AQM-tail" technique, including marking packets prior to enqueuing at the tail of the queue, in accordance with an aspect of the present application.

FIG. 3 presents a flowchart 300 illustrating a method which facilitates an excess-AQM-tail technique, including marking packets prior to enqueuing at the tail of the queue, in accordance with an aspect of the present application. Subsequent to the operations of FIG. 2, the system marks the first packet to indicate congestion (e.g., to a TCP endpoint) (operation 302). The system enqueues the first packet (which is tagged as an excess packet and marked to indicate congestion) (operation 304). When the first packet reaches the head of the queue, the system dequeues the first packet at the head of the queue (operation 306). If the first packet is not tagged as an excess packet (decision 308), the system forwards the first packet (which is not marked to indicate congestion, e.g., not ECN-marked) (operation 310) and the operation returns.

If the first packet is tagged as an excess packet (decision 308), the system decreases the excess amount value (operation 312) and forwards the first packet (which is marked to indicate congestion, e.g., is ECN-marked) (operation 314). The operation returns.

Figure 4:
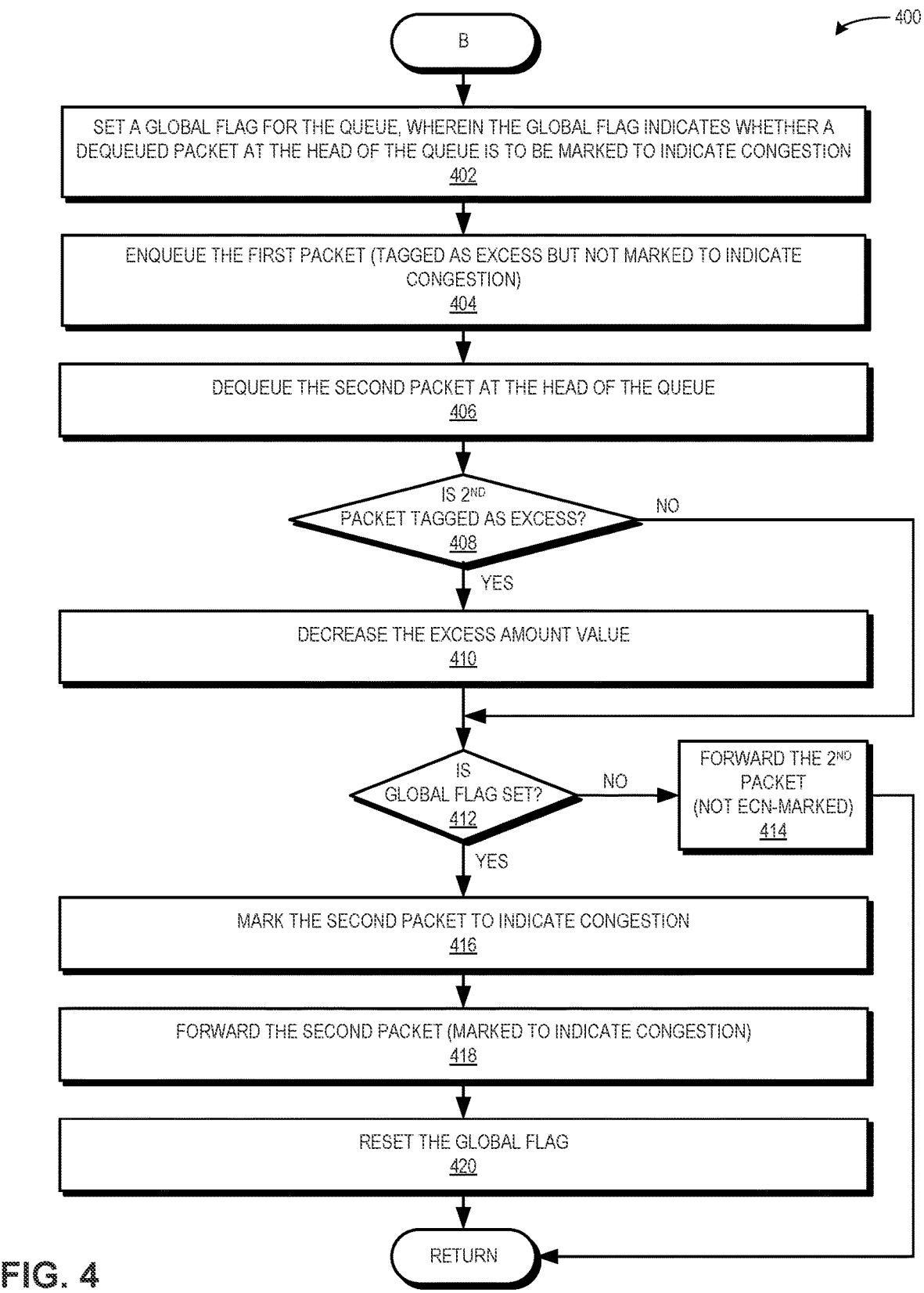
FIG. 4 presents a flowchart illustrating a method which facilitates an "excess-AQM-head" technique, including marking packets subsequent to dequeuing at the head of the queue, in accordance with an aspect of the present application.

FIG. 4 presents a flowchart 400 illustrating a method which facilitates an excess-AQM-head technique, including marking packets subsequent to dequeuing at the head of the queue, in accordance with an aspect of the present application. Subsequent to the operations of FIG. 2, the system sets a global flag for the queue, wherein the global flag indicates whether a dequeued packet at the head of the queue is to be marked to indicate congestion (operation 402). The system enqueues the first packet (which is tagged as an excess packet but not marked to indicate congestion) (operation 404). At a subsequent time, the system dequeues a packet ("the second packet" of operation 222) at the head of the queue (operation 406). If the second packet is not tagged as an excess packet (decision 408), the operation continues at decision 412. If the second packet is tagged as an excess packet (decision 408), the system decreases the excess amount value (operation 410).

If the global flag is not set (decision 412), the system forwards the second packet (which is not marked to indicate congestion, e.g., not ECN-marked) (operation 414) and the operation returns. If the global flag is set (decision 412), the system marks the second packet to indicate congestion (e.g., sets the ECN-CE value) (decision 416) and forwards the second packet (which is marked to indicate congestion, e.g., is ECN-marked) (operation 418). The system resets the global flag (operation 420) and the operation returns.

Figure 5:
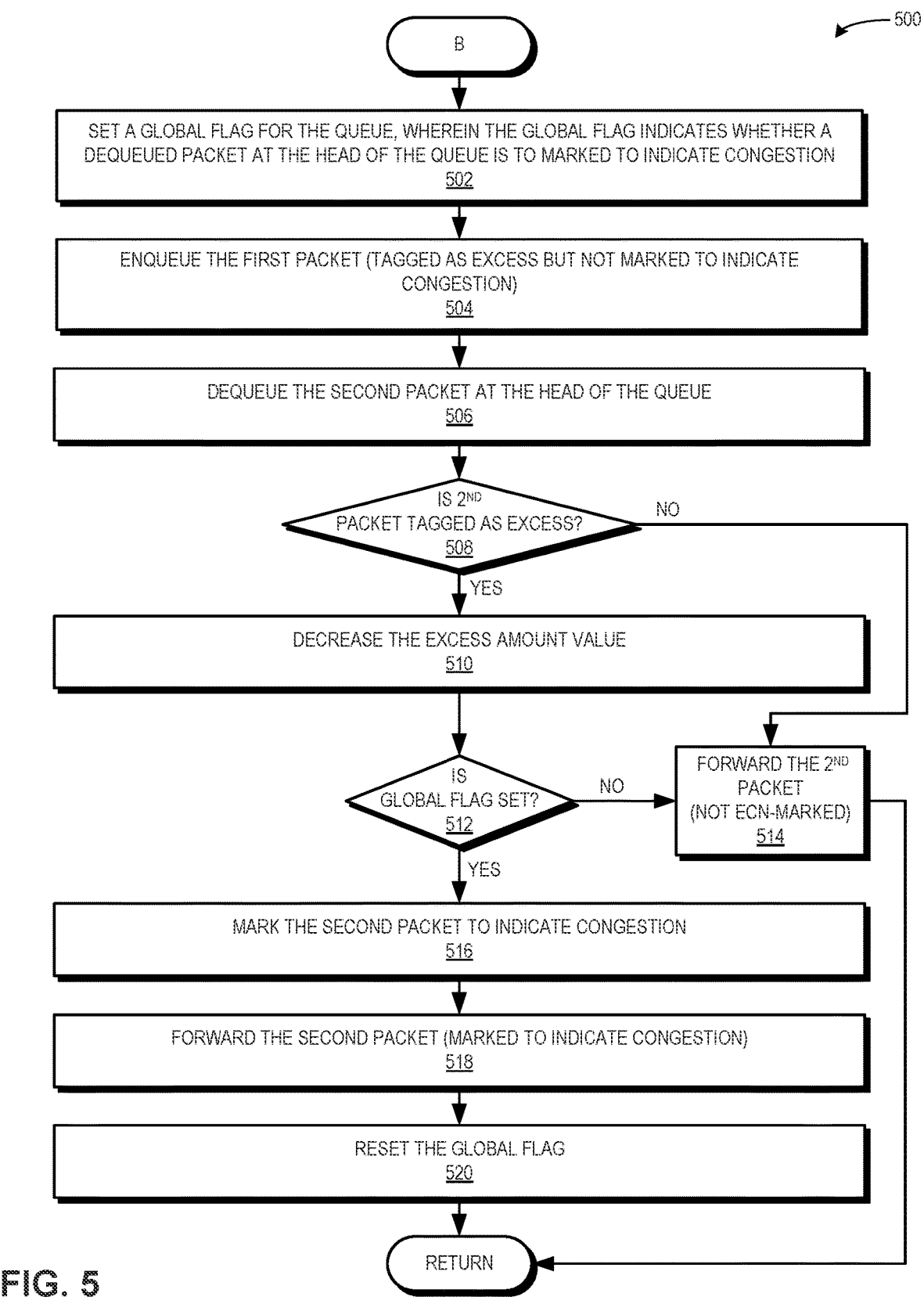
FIG. 5 presents a flowchart illustrating a method which facilitates an "excess-AQM-both" technique, including marking packets subsequent to both determining an excess packet and dequeuing at the head of the queue, in accordance with an aspect of the present application.

FIG. 5 presents a flowchart 500 illustrating a method which facilitates an excess-AQM-both technique, including marking packets subsequent to both determining an excess packet and dequeuing at the head of the queue, in accordance with an aspect of the present application. Subsequent to the operations of FIG. 2, the system sets a global flag for the queue, wherein the global flag indicates whether a dequeued packet at the head of the queue is to be marked to indicate congestion (operation 502). The system enqueues the first packet (which is tagged as an excess packet but not marked to indicate congestion) (operation 504). At a subsequent time, the system dequeues a packet ("the second packet" of operation 222) at the head of the queue (operation 506). If the second packet is not tagged as an excess packet (decision 508), the system forwards the second packet (which is not ECN-marked) (operation 514) and the operation returns. If the second packet is tagged as an excess packet (decision 508), the system decreases the excess amount value (operation 510).

If the global flag is not set (decision 512), the system forwards the second packet (which is not ECN-marked) (operation 514) and the operation returns. If the global flag is set (decision 512), the system marks the second packet to indicate congestion (e.g., sets the ECN-CE value) (decision 516) and forwards the second packet (which is marked to indicate congestion, e.g., is ECN-marked) (operation 518). The system resets the global flag (operation 520) and the operation returns.

Figure 6:
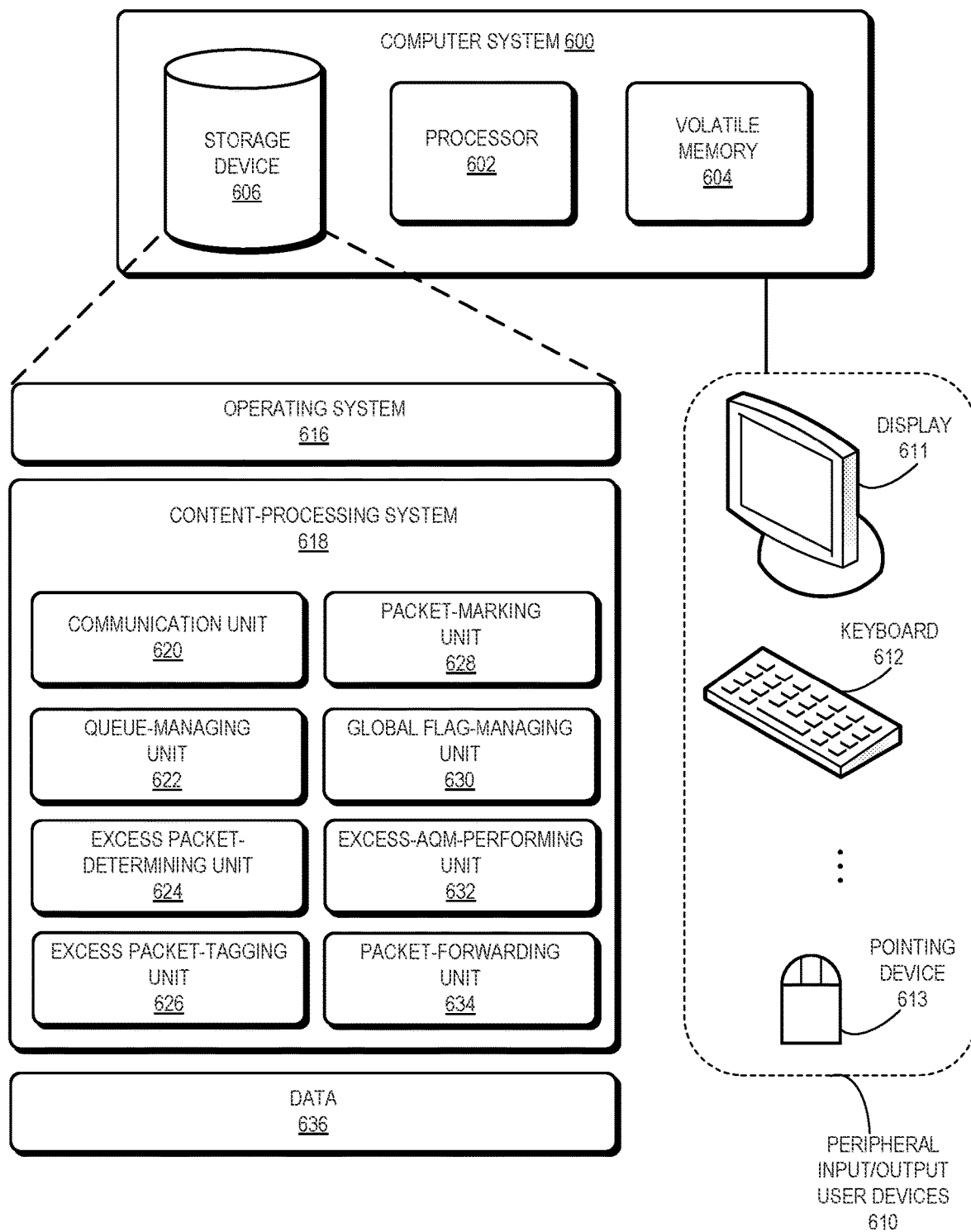
FIG. 6 illustrates a computer system which facilitates excess-AQM, in accordance with an aspect of the present application.

FIG. 6 illustrates a computer system which facilitates excess-AQM, in accordance with an aspect of the present application. Computer system 600 includes a processor 602, a memory 604, and a storage device 606. Memory 604 can include a volatile memory (e.g., RAM) that serves as a managed memory, and can be used to store one or more memory pools. Furthermore, computer system 600 can be coupled to peripheral input/output (I/O) user devices 610 (e.g., a display device 611, a keyboard 612, and a pointing device 613). Storage device 606 can store an operating system 616, a content-processing system 618, and data 636.

Content-processing system 618 can include instructions, which when executed by computer system 600, can cause computer system 600 to perform methods and/or processes described in this disclosure. Specifically, content-processing system 618 may include instructions for sending and/or receiving data to/from other modules/units/components within computer system 600 or to/from other network nodes across a computer network (communication unit 620).

Content-processing system 618 can further include instructions for maintaining a queue for storing packets, wherein packets are enqueued at a tail of the queue and dequeued at a head of the queue (queue-managing unit 622). Content-processing system 618 can include instructions for computing a queue utilization value associated with the queue, wherein the queue utilization value is based on the packets stored in the queue, and for computing an excess amount value associated with the queue, wherein the excess amount value is based on the packets stored in the queue and previously tagged as excess packets (excess packet-determining unit 624). Content-processing system 618 can include instructions for receiving a first packet at the tail of the queue (communication unit 620). Content-processing system 618 can include instructions for determining whether a difference between the queue utilization value and the excess amount value exceeds a predetermined threshold (excess packet-determining unit 624). Content-processing system 618 can include instructions for, responsive to determining that the difference exceeds the predetermined threshold (excess packet-determining unit 624), tagging the first packet as an excess packet (excess packet-tagging unit 626). Content-processing system 618 can also include instructions for, responsive to tagging the first packet as an excess packet (excess packet-tagging unit 626), performing an operation associated with the first packet or a second packet at the head of the queue to reduce congestion (excess-AQM-performing unit 632). Content-processing system 618 can include instructions for forwarding a packet to a destination device (packet-forwarding unit 634).

Content-processing system 618 can additionally include instructions for marking a packet to indicate congestion (packet-marking unit 628), setting or resetting a global flag for the queue (global flag-managing unit 630), setting a value of an ECN-CE value in a header (packet-marking unit 628), and incrementing/decrementing the queue utilization value and the excess amount value (excess packet-determining unit 624).

Data 636 can include any data that is required as input or that is generated as output by the methods and/or processes described in this disclosure. Specifically, data 636 can store at least: data; a queue; a queue utilization value; a length of a queue; a maximum length of a queue; a predetermined or configured threshold; an excess amount value; a global flag; an indicator of an excess packet; a packet tagged as excess; a number of packets or bytes in the queue; a number of excess packets or bytes of the excess packets in the queue; a queuing delay associated with the packets in the queue; a queuing delay associated with the excess packets in the queue; metadata; an ECN-CE value; an Ethernet pause frame; a flow control signal or a flow control packet; and an indicator of an enqueued or dequeued packet.

While FIG. 6 depicts a computer system with instructions for performing the operations of the excess-AQMs described herein, the described aspects can also include an apparatus, including a networking device (such as a switch or a router) or other hardware device/component, which can facilitate excess-AQM. The apparatus can comprise a plurality of units or apparatuses which may communicate with one another via a wired, wireless, quantum light, or electrical communication channel. The apparatus may be realized using one or more integrated circuits. The apparatus may be integrated in a computer system or realized as a separate device or devices capable of communicating with other computer systems and/or devices. The apparatus may also include a non-volatile storage system or a memory management unit. The apparatus can comprise modules or units which are configured to perform functions or operations similar to units 620-634 of computer system 600 of FIG. 6. The apparatus may include fewer or more units or apparatuses than the units shown in FIG. 6.

Aspects and Variations of the Instant Application

In general, the disclosed aspects provide a method, computer system, and non-transitory computer-readable storage medium for facilitating actively managing packets in queues. In one aspect, the system maintains a queue for storing packets, wherein packets are enqueued at a tail of the queue and dequeued at a head of the queue. The system computes a queue utilization value associated with the queue, wherein the queue utilization value is based on the packets stored in the queue. The system computes an excess amount value associated with the queue, wherein the excess amount value is based on the packets stored in the queue and previously tagged as excess packets. The system receives a first packet at the tail of the queue. The system determines whether a difference between the queue utilization value and the excess amount value exceeds a predetermined threshold. Responsive to determining that the difference exceeds the predetermined threshold, the system tags the first packet as an excess packet. Response to tagging the first packet as an excess packet, the system performs an operation associated with the first packet or a second packet at the head of the queue to reduce congestion.

In a variation on this aspect, responsive to determining that the queue utilization value indicates that the queue is full, the system drops the first packet prior to determining whether the difference exceeds the predetermined threshold.

In a further variation, determining whether the difference exceeds the predetermined threshold is performed responsive to determining that the queue utilization value indicates that the queue is not full. Responsive to determining that the difference exceeds the predetermined threshold, the system enqueues the first packet in the queue.

In a further variation, performing the operation associated with the first packet comprises marking the first packet to indicate congestion.

In a further variation, performing the operation associated with the first packet comprises setting a global flag for the queue, wherein the global flag indicates whether a dequeued packet at the head of the queue is to be marked to indicate congestion.

In a further variation, performing the operation associated with the second packet comprises, responsive to determining that the global flag is set, marking the second packet to indicate congestion and resetting the global flag.

In a further variation, performing the operation associated with the second packet comprises, responsive to determining that the global flag is set and that the second packet is tagged as an excess packet, marking the second packet to indicate congestion and resetting the global flag.

In a further variation, performing the operation associated with the first packet or the second packet comprises setting a value of an explicit congestion notification congestion experienced (ECN-CE) value in a header of the first packet or the second packet.

In a further variation, performing the operation associated with the first packet or the second packet comprises generating an Ethernet pause frame.

In a further variation, performing the operation associated with the first packet or the second packet comprises generating a flow control signal or a flow control packet.

In a further variation, the queue utilization value and the excess amount value respectively comprise one of: a number of packets in the queue and a number of excess packets in the queue; a number of bytes in the queue and a number of bytes of the excess packets in the queue; and a queuing delay associated with the packets in the queue and a queuing delay associated with the excess packets in the queue.

In a further variation, the excess amount value is incremented upon tagging a respective packet as an excess packet and enqueuing the respective packet at the tail of the queue. The excess amount value is decremented upon dequeuing the respective packet at the head of the queue.

In another aspect, a computer system comprises a processor and a storage device which stores instructions that when executed by the processor cause the processor to perform the method as described above, including in relation to FIGS. 2-6.

In yet another aspect, a non-transitory computer-readable storage medium stores instructions that when executed by a computer cause the computer to perform the method described above, including in relation to FIGS. 2-6.

The foregoing description is presented to enable any person skilled in the art to make and use the aspects and examples, and is provided in the context of a particular application and its requirements. Various modifications to the disclosed aspects will be readily apparent to those skilled in the art, and the general principles defined herein may be applied to other aspects and applications without departing from the spirit and scope of the present disclosure. Thus, the aspects described herein are not limited to the aspects shown, but are to be accorded the widest scope consistent with the principles and features disclosed herein.

Furthermore, the foregoing descriptions of aspects have been presented for purposes of illustration and description only. They are not intended to be exhaustive or to limit the aspects described herein to the forms disclosed. Accordingly, many modifications and variations will be apparent to practitioners skilled in the art. Additionally, the above disclosure is not intended to limit the aspects described herein. The scope of the aspects described herein is defined by the appended claims.

What is claimed is:

1. A computer-implemented method for actively managing packets in queues, the method comprising:
   receiving packets to be transmitted from a multi-queue structure based on Transport Control Protocol (TCP);
   maintaining, in the multi-queue structure, a queue for storing packets, wherein packets are enqueued at a tail of the queue and dequeued at a head of the queue;
   computing a queue utilization value associated with the queue, wherein the queue utilization value is based on the packets stored in the queue;

computing an excess amount value associated with the queue, wherein the excess amount value is based on the packets stored in the queue and previously tagged as excess packets;

receiving a first packet at the tail of the queue;

determining whether a difference between the queue utilization value and the excess amount value exceeds a predetermined threshold;

responsive to determining that the difference exceeds the predetermined threshold, tagging the first packet as an excess packet; and responsive to tagging the first packet as an excess packet, reducing congestion associated with transmission of the packets by performing a packet-marking or value-setting operation associated with the first packet at the tail of the queue or a second packet at the head of the queue.

2. The method of claim 1, further comprising:

responsive to determining that the queue utilization value indicates that the queue is full, dropping the first packet prior to determining whether the difference exceeds the predetermined threshold.

3. The method of claim 1, wherein determining whether the difference exceeds the predetermined threshold is performed responsive to determining that the queue utilization value indicates that the queue is not full, and wherein responsive to determining that the difference exceeds the predetermined threshold, the method further comprises enqueuing the first packet in the queue.

4. The method of claim 1, wherein performing the packet-marking or value-setting operation associated with the first packet comprises:

marking the first packet to indicate congestion.

5. The method of claim 1, wherein performing the packet-marking or value-setting operation associated with the first packet comprises:

setting a global flag for the queue, wherein the global flag indicates whether a dequeued packet at the head of the queue is to be marked to indicate congestion.

6. The method of claim 5, wherein performing the packet-marking or value-setting operation associated with the second packet comprises:

responsive to determining that the global flag is set, marking the second packet to indicate congestion and resetting the global flag.

7. The method of claim 5, wherein performing the packet-marking or value-setting operation associated with the second packet comprises:

responsive to determining that the global flag is set and that the second packet is tagged as an excess packet, marking the second packet to indicate congestion and resetting the global flag.

8. The method of claim 1, wherein performing the packet-marking or value-setting operation associated with the first packet or the second packet comprises:

setting a value of an explicit congestion notification congestion experienced (ECN-CE) value in a header of the first packet or the second packet.

9. The method of claim 1, wherein performing the packet-marking or value-setting operation associated with the first packet or the second packet comprises:

generating an Ethernet pause frame.

10. The method of claim 1, wherein performing the packet-marking or value-setting operation associated with the first packet or the second packet comprises:

generating a flow control signal or a flow control packet.

11. The method of claim 1, wherein the queue utilization value and the excess amount value respectively comprise one of:

a number of packets in the queue and a number of excess packets in the queue;

a number of bytes in the queue and a number of bytes of the excess packets in the queue; and a queuing delay associated with the packets in the queue and a queuing delay associated with the excess packets in the queue.

12. The method of claim 1, comprising:

wherein the excess amount value is incremented upon tagging a respective packet as an excess packet and enqueuing the respective packet at the tail of the queue, and wherein the excess amount value is decremented upon dequeuing the respective packet at the head of the queue.

13. A computer system, comprising:

a processor; and a storage device storing instructions that when executed by the processor cause the processor to perform a method, the method comprising:

receiving packets to be transmitted from a multi-queue structure based on Transport Control Protocol (TCP);

maintaining, in the multi-queue structure, a queue for storing packets, wherein packets are enqueued at a tail of the queue and dequeued at a head of the queue;

computing a queue utilization value associated with the queue, wherein the queue utilization value is based on the packets stored in the queue;

computing an excess amount value associated with the queue, wherein the excess amount value is based on the packets stored in the queue and previously tagged as excess packets;

receiving a first packet at the tail of the queue;

determining whether a difference between the queue utilization value and the excess amount value exceeds a predetermined threshold;

responsive to determining that the difference exceeds the predetermined threshold, tagging the first packet as an excess packet; and responsive to tagging the first packet as an excess packet, reducing congestion associated with transmission of the packets by performing a packet-marking or value-setting operation associated with the first packet at the tail of the queue or a second packet at the head of the queue.

14. The computer system of claim 13, wherein determining whether the difference exceeds the predetermined threshold is performed responsive to determining that the queue utilization value indicates that the queue is not full, and wherein responsive to determining that the difference exceeds the predetermined threshold, the method further comprises enqueuing the first packet in the queue.

15. The computer system of claim 13, wherein performing the packet-marking or value-setting operation associated with the first packet comprises:

marking the first packet to indicate congestion.

16. The computer system of claim 13, wherein performing the packet-marking or value-setting operation associated with the first packet comprises:

setting a global flag for the queue, wherein the global flag indicates whether a dequeued packet at the head of the queue is to be marked to indicate congestion.

17. The computer system of claim 16, wherein performing the packet-marking or value-setting operation associated with the second packet comprises:
  responsive to determining that the global flag is set, marking the second packet to indicate congestion and resetting the global flag.

18. The computer system of claim 16, wherein performing the packet-marking or value-setting operation associated with the second packet comprises:
  responsive to determining that the global flag is set and that the second packet is tagged as an excess packet, marking the second packet to indicate congestion and resetting the global flag.

19. The computer system of claim 13, wherein performing the packet-marking or value-setting operation associated with the first packet or the second packet comprises at least one of:
  setting a value of an explicit congestion notification congestion experienced (ECN-CE) value in a header of the first packet or the second packet;
  generating an Ethernet pause frame; and
  generating a flow control signal or a flow control packet.

20. A non-transitory computer-readable storage medium storing instructions that when executed by a computer cause the computer to perform a method, the method comprising:
  receiving packets to be transmitted from a multi-queue structure based on Transport Control Protocol (TCP);
  maintaining, in the multi-queue structure, a queue for storing packets, wherein packets are enqueued at a tail of the queue and dequeued at a head of the queue;
  computing a queue utilization value associated with the queue, wherein the queue utilization value is based on the packets stored in the queue;
  computing an excess amount value associated with the queue, wherein the excess amount value is based on the packets stored in the queue and previously tagged as excess packets;
  receiving a first packet at the tail of the queue;
  determining whether a difference between the queue utilization value and the excess amount value exceeds a predetermined threshold;
  responsive to determining that the difference exceeds the predetermined threshold, tagging the first packet as an excess packet; and
  responsive to tagging the first packet as an excess packet, reducing congestion associated with transmission of the packets by performing a packet-marking or value-setting operation associated with the first packet at the tail of the queue or a second packet at the head of the queue.

\* \* \* \* \*